US009092560B2

(12) United States Patent
Mayer

(10) Patent No.: US 9,092,560 B2
(45) Date of Patent: Jul. 28, 2015

(54) TRACE BASED MEASUREMENT ARCHITECTURE

(71) Applicant: Infineon Technologies AG, Neubiberg (DE)

(72) Inventor: Albrecht Mayer, Deisenhofen (DE)

(73) Assignee: Infineon Technologies AG, Neubiberg (DE)

( * ) Notice: Subject to any disclaimer, the term of this patent is extended or adjusted under 35 U.S.C. 154(b) by 254 days.

(21) Appl. No.: 13/632,529

(22) Filed: Oct. 1, 2012

(65) Prior Publication Data

US 2014/0095846 A1 Apr. 3, 2014

(51) Int. Cl.
*G06F 11/00* (2006.01)
*G06F 11/34* (2006.01)

(52) U.S. Cl.
CPC .................. *G06F 11/3476* (2013.01)

(58) Field of Classification Search
CPC ............. G06F 11/3636; G06F 11/364; G06F 11/3466; G06F 11/3476
USPC ............................................ 714/45; 712/227
See application file for complete search history.

(56) References Cited

U.S. PATENT DOCUMENTS

| 6,523,136 | B1 * | 2/2003 | Higashida ........................ 714/30 |
| 8,407,528 | B2 * | 3/2013 | Larson ............................ 714/45 |
| 8,464,089 | B2 * | 6/2013 | Watanabe et al. .............. 713/501 |
| 8,601,324 | B2 * | 12/2013 | Horley et al. ................... 714/45 |
| 2006/0101180 | A1 * | 5/2006 | Tuppa ............................ 710/260 |
| 2009/0187747 | A1 * | 7/2009 | Mayer et al. ................... 712/227 |

* cited by examiner

*Primary Examiner* — Philip Guyton
(74) *Attorney, Agent, or Firm* — Eschweiler & Associates, LLC

(57) ABSTRACT

A method for performing trace based measurement for a plurality of CPUs in parallel includes receiving a signal to perform a CPU parallel trace mode and enabling a parallel trace mode multiplexer to output all trace data, representing all data writes to the local memory, to a single observation unit. In one embodiment, the single observation unit is a processor observation block (POB), and in another embodiment, a bus observation block (BOB). If the single observation unit is a BOB, then the parallel trace mode multiplexer first routes the local memory data trace through a BOB adaptation layer to convert the CPU trace output data to data which is understood by the BOB.

9 Claims, 5 Drawing Sheets

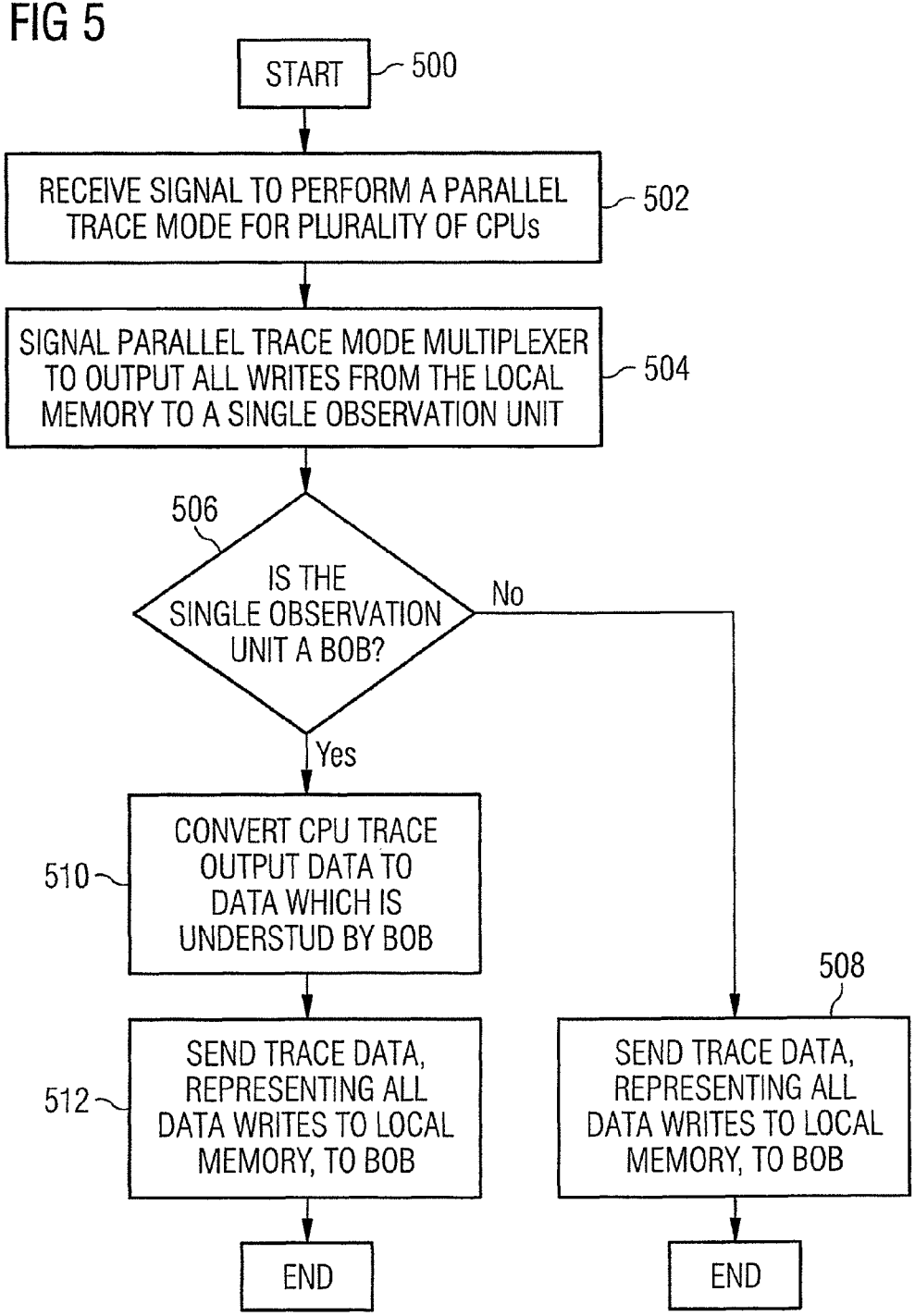

TRACE BASED MEASUREMENT ARCHITECTURE

FIELD

The invention relates to methods and systems for trace solutions for central processing units in a computer processing system. More specifically, the invention relates to methods and systems for a trace based measurement architecture for observing a plurality of CPUs in parallel.

BACKGROUND

For software debugging or performance analysis, a trace flow enables the reconstruction of a monitored program flow and is therefore useful to determine which kind of events took place before a particular software problem arose. Trace Based Measurement (hereinafter "TBM") is used to observe the behavior of a real time control system (e.g. automotive Electronic Control Unit ECU) on a higher level. Such a real time control system gets input values from sensors from which the control algorithm calculates actuator values. All these values are so called signals, which need to be observed for analyzing the system behavior. TBM is the most desired automotive measurement solution due to the achievable measurement performance and the negligible run time impact. For TBM, the signals are being observed by tracing, and a consistent capturing for system states is then done externally using a so called mirror RAM. The content of the mirror RAM is the same as that of the internal RAM since it is written with the data retrieved from the trace. The main requirement of TBM is that all writes to on-chip RAMs with such "signals" can be traced.

FIG. 1 is a high-level block diagram illustrating a conventional system for a trace based measurement architecture 100. The conventional trace based measurement system is implemented on a microchip and includes multiple central processing units (CPUs) 102a, 102b, and 102c, with local memories, Shared Resource Interconnect (SRI) modules, 104a and 104b, for a higher performance crossbar bus structure, a system bus 106, a central internal memory 108, a debug port 110, a JTAG interface 112, and a trace unit 114. The trace unit 114 further comprises a plurality of bus observation blocks (BOBs), 116a, 116b, a plurality of processor observation blocks (POBs), 118a, 118b, a Debug Memory Controller (DMC) module 122, a Debug Memory (DM) 124, and a Trace Port (TP) 126.

The trace unit 114 enables reconstruction of a monitored program flow via flow trace data decompression algorithms implemented by an external tool (not shown). This tool controls the trace unit 114 via the JTAG tool interface 112. For these purposes, the trace unit 114 processes trace data, i.e. information about a running application, without halting its execution and may record the trace data sequentially, i.e. information about executed instructions may be stored in the sequence of their execution. The trace unit 114 may record values of one or more instruction pointer registers 120, also known as program counter(s), and the values of one or more stacks of the CPU 104 and/or may record data accessed and processed by the CPU 104 and/or the data flow on the system bus 106 or other busses of the CPU 104 or system 100. For TBM, only the capability of trace unit 114 to record all writes to a RAM is relevant. This can be done by recording all writes of all masters (e.g. CPUs, DMA channels, etc.) which write to this memory.

The Debug Memory Controller DMC 122 in FIG. 1 collects the generated trace messages from all the different POBs 118 and BOBs 116 and writes them to the Debug Memory DM 124 in full RAM data lines of the DM (e.g. 256 bits to achieve the required peak bandwidth). The DM 124 is function wise a FIFO. The trace data is output from there via the Trace Port TP 124, which is either a parallel trace interface (e.g. 16 data pins+clock) or with a high-speed serial interface like Xilinx' Aurora.

One of the main requirements for TBM is that all writes to memory which contain data values representing signals can be traced. The main memories with this property are the local CPU memories. FIG. 2 shows a schematic diagram of a conventional CPU trace architecture. The CPU 102 comprises a CPU pipeline 204, a local memory 206, a multiplexer 208, a bus observation block (BOB) 216 and a processor observation block (POB) 218. The processor observation block 218 captures trace data from CPU stores. This CPU store trace outputs all the desired trace information which is typically needed for debugging. For the debugging use case, all writes to all locations of the software running on this CPU are of interest. The bus observation block 216 captures trace data to the local memory from other CPUs, DMAs, or peripherals with a bus master interface. Thus, conventional tracing systems for TBM typically comprise two observation units for tracing a CPU's single local memory.

Conventional TBM has several disadvantages. As discussed above, one disadvantage is the need for two observation units for each CPU's single local memory. The data memory of a CPU can be written from two sides. One side is for the CPU itself, and the other side is for writes from other CPUs, DMAs or peripherals with a bus master interface. As a result, two observation units for tracing a given CPU are needed: a Processor Observation Block (POB) for tracing signals to and from the CPU, and a Bus Observation Block (BOB) for tracing signals to the local memory from other devices.

Another disadvantage with conventional TBM systems is the limited number of CPU observation units. For debugging purposes, it is sufficient to observe any two out of N CPUs in parallel. Thus, just two POBs are provided in conventional systems and the trace output of the N CPUs is routed via a trace multiplexer to these POBs. For TBM, however, it is necessary to observe all CPUs in parallel in a restricted way with only data write trace. Thus, the current architecture of conventional TBM systems is inadequate to support observation of all CPUs in parallel, and the number of observation units in a conventional TBM system cannot be extended easily due to the overhead wiring and restricted trace memory bandwidth.

With the current set of observation units (POBs, BOBs), which is a good fit for debugging, only the local memory of two CPUs can be traced for TBM. Tracing a third CPU and its corresponding LMU memory using conventional methods would require another three observation units.

Therefore, there exists a need for a system and a method for a trace based measurement architecture for tracing multiple CPUs in parallel which does not significantly increase cost, efficiency or observation units required.

SUMMARY

In accordance with one aspect of the invention, a system for performing trace based measurement for a plurality of CPUs in parallel comprises a plurality of CPUs, a local memory coupled to each of the CPUs and adapted to receive and store trace data, and a parallel trace mode multiplexer coupled to the local memory of each CPU. In one embodiment, the system may operate in a debug mode or a parallel trace based measurement mode. When operating in the parallel trace based measurement mode, the parallel trace mode multiplexer for each CPU outputs trace data representing all data writes, not just the ones of the CPU itself, to the local memory of the respective CPU to a single observation unit. In one embodiment, the single observation unit may be a processor observation block (POB), and in another embodiment, the single observation unit may be a bus observation block (BOB). In one embodiment when the single observation unit is a bus observation unit (BOB), the system further comprises a BOB adaptation layer to convert the CPU trace output data to data which is understood by the BOB. The converted trace data, representing all data writes to the local memory, is then sent to the BOB.

In accordance with another aspect of the invention, a method for performing trace based measurement for a plurality of CPUs in parallel comprises receiving a signal to perform a CPU parallel trace mode and enabling a parallel trace mode multiplexer to output all trace data, representing all data writes to the local memory, to a single observation unit. In one embodiment, the single observation unit is a processor observation block (POB), and in another embodiment, the single observation unit for the local memory may be a bus observation block (BOB). If the single observation unit is a bus observation unit (BOB), then the parallel trace mode multiplexer first routes the local memory data trace through a BOB adaptation layer to convert the CPU trace output data to data which is understood by the BOB. The trace data, representing all data writes to the local memory, is then sent to the BOB.

Further features, aspects and advantages of the present invention will become apparent from the following detailed description of the invention made with reference to the accompanying drawings.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated as they become better understood by reference to the following detailed description.

FIG. 5 is a flowchart showing a method for performing trace based measurement for a plurality of CPUs in parallel in accordance with one embodiment of the present invention.

DETAILED DESCRIPTION

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. Therefore, the following detailed description is not to be taken in a limiting sense, and the scope of the present invention is defined by the appended claims.

Trace flows are useful for software debugging of applications to determine which kind of events had taken place before a particular software problem arose. Trace flows are also useful to analyze performance of task-oriented embedded and non-embedded applications executed on various software/hardware platforms. For example, task oriented software programs may be executed by processors applicable to controlling aspects of industrial and consumer devices, or may include business and scientific application software. For the purposes of this description, applications, software programs, application software, program applications, and programs comprise sets of instructions executable by microprocessors, and such terms may be interchangeably used. In general, trace flows enable reconstruction of a monitored program flow.

Figure 1:
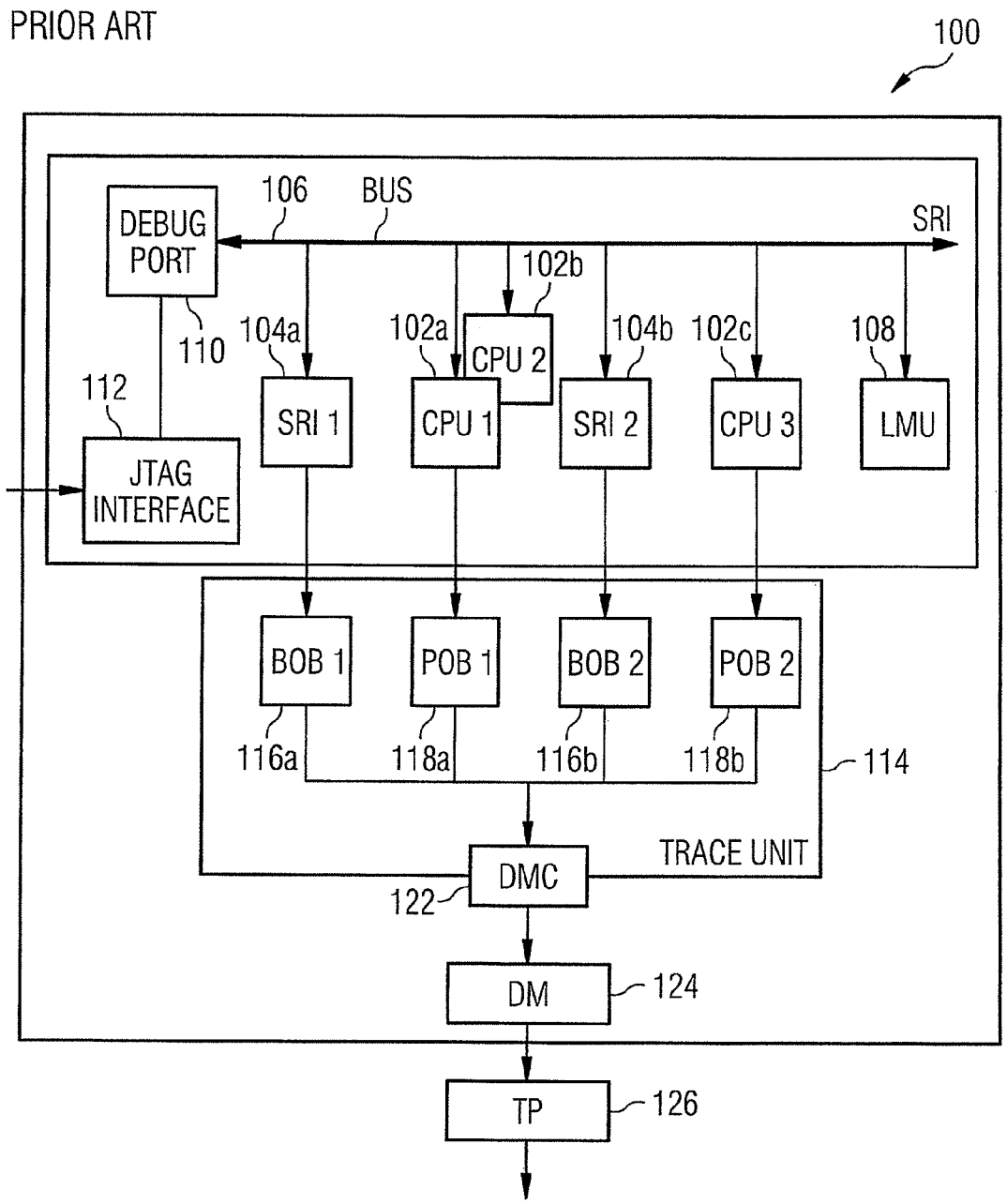
FIG. 1 shows a schematic diagram of a conventional system for trace based measurement.
Figure 2:
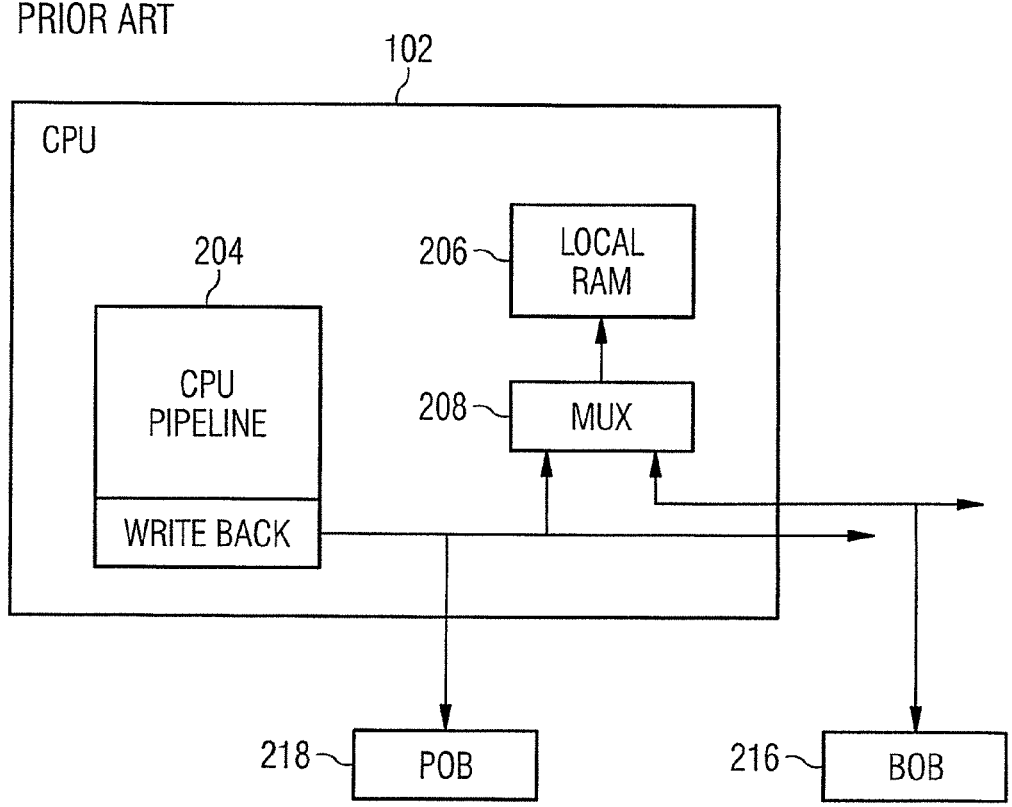
FIG. 2 shows a schematic diagram of a conventional CPU trace architecture.
Figure 3:
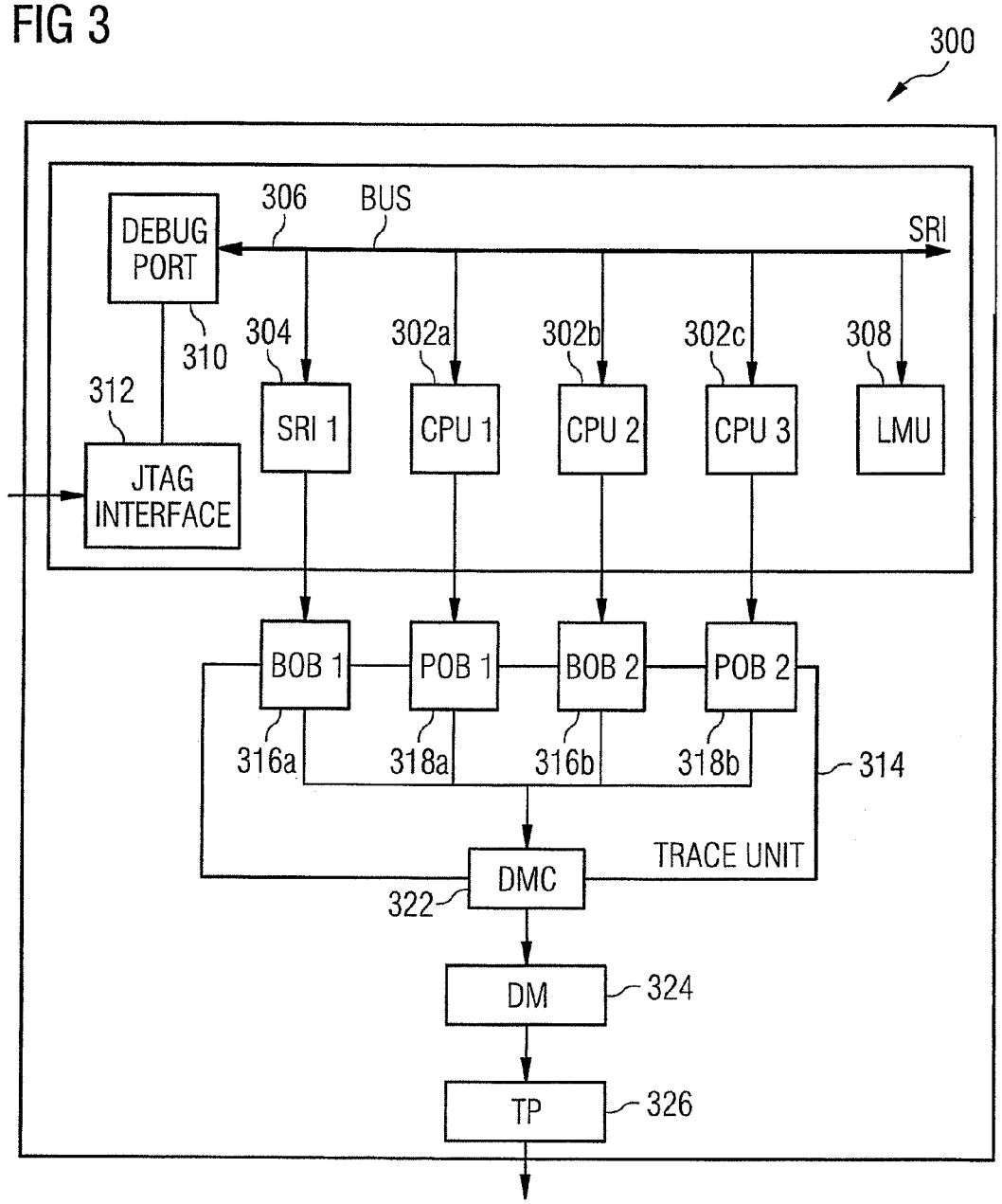
FIG. 3 shows a schematic diagram of a trace based measurement architecture in accordance with one embodiment of the present invention.

FIG. 3 is a high-level block diagram illustrating a trace based measurement architecture 300 in accordance with one embodiment of the present invention. A trace based measurement architecture in accordance with the present invention is implemented on a microchip and includes multiple central processing units (CPUs) 302a, 302b and 302c, an SRI module 304, a system bus 306, an internal memory 308, a debug port 310, a JTAG interface 312, and a trace unit 314. The trace unit 314 further comprises a plurality of bus observation blocks (BOBs), 316a, 316b, a plurality of processor observation blocks (POBs), 318a, 318b, a DMC module 322, a DM module 324 and a TP module 326.

The CPUs, 302a-302c, are coupled to the internal memory 308 via the system bus 306. As illustrated, the internal memory 308 and CPUs 302a-302c may be provided on a single microchip. However, one skilled in the art will appreciate that the scope of the present invention also covers a plurality of microchips which may provide for various configurations of the components of processing system 300. The memory 308 may comprise any combination of volatile random access memory (RAM) and non-volatile read-only memory (ROM) for storing an operating system (OS) and embedded and/or non-embedded program applications. The internal memory 308 may also be adapted to store data, as well as program instructions.

The debug port 310, also known as the debug access port, enables an external debugging tool to directly access the device without requiring the processor to enter the debug state. The JTAG interface 312 is an interface between the on chip debug architecture and a debug tool which is usually software based.

The trace unit 314 of the present invention enables data tracing for TBM of all three CPUs in parallel. The bus observation blocks (BOBs) 316a, 316b, are used to capture the data write trace of one of the CPUs and the SRI. Thus, POBs 318a, 318b enable tracing of CPU1 302a and CPU3 302c respectively, and BOBs 316a, 316b capture data write traces for SRI1 304 and CPU2 302b, respectively. The SRI data write trace enables the system to trace all writes to the SRI slave LMU 308 memory.

Thus, the present invention advantageously enables tracing all writes to all CPU local RAMs and to the LMU RAM without increasing the number of observation units (POBs, BOBs) required.

Figure 4:
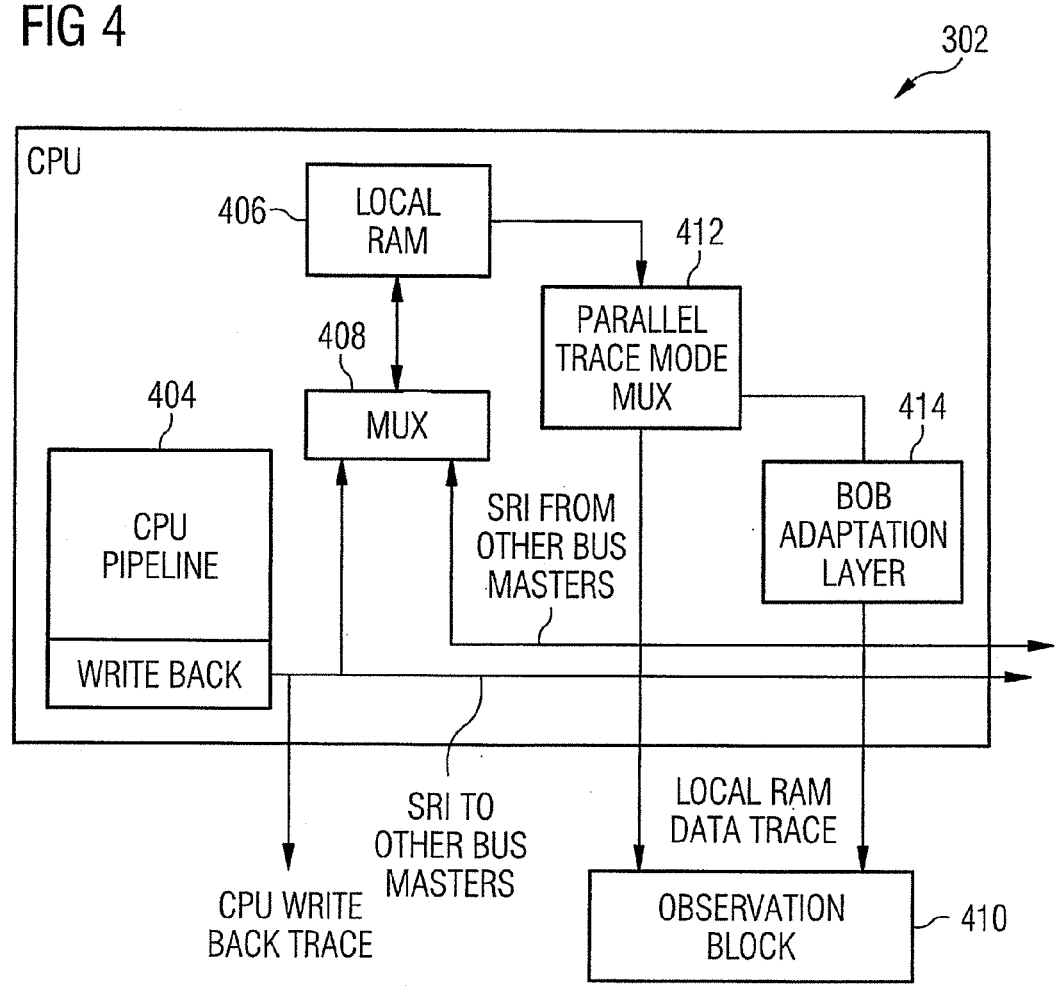
FIG. 4 shows a schematic diagram of a CPU trace architecture in accordance with one embodiment of the present invention.

FIG. 4 is a schematic diagram of a CPU trace architecture in accordance with one embodiment of the present invention. The CPU 302 comprises a buffer 404 for CPU data and instructions, a local memory 406, a multiplexer 408, for accessing and writing to the local memory 406, a parallel trace mode multiplexer 412, and a single observation block 410. The local memory 406 stores write back trace data from the CPU 302 and is also accessible by at least one other master, e.g. one of the other CPUs. In accordance with one embodiment of the present invention, when the computer processing system is in a "parallel trace mode", the trace multiplexer 412 is activated and routes all CPU write back data traces and SRI slave data traces to the single observation block 410.

In one embodiment, the single observation block 410 may be the processor observation block 318 described above in reference to FIG. 3. In another embodiment, the single observation block 410 may be the bus observation block 316 described above in reference to FIG. 3. In such embodiment, the CPU 302 further comprises an adaption layer (not shown in FIG. 3, see block 414 in FIG. 4) to convert the CPU trace output to data which is understood by the bus observation block 316.

FIG. 5 is a flowchart showing a method 500 for performing trace based measurement for several CPUs in parallel in accordance with one embodiment of the present invention. For clarity, the method 500 for performing trace based measurement for CPUs in parallel is described in context of the system 300 and CPU 302 described in FIGS. 3 and 4. However, in alternate embodiments, other configurations may be used. Moreover, other embodiments may perform the steps described here in different orders and/or other embodiments may perform additional and/or different steps than those described here.

Initially, in response to a trace unit receiving a signal to perform a CPU parallel trace mode at 502 in which trace based measurements are performed for a plurality of CPUs in parallel, the trace unit signals the parallel trace mode multiplexer 412 to output all writes from the local memory 406 to a single observation unit 410 at 504. In one embodiment, the single observation unit 410 is a processor observation block POB for receiving CPU write back data trace, and in another embodiment, the single observation unit 410 for the local memory 406 may be a bus observation block BOB.

The method determines whether the single observation unit is a processor observation unit or a bus observation unit at 506. If the single observation unit is a processor observation unit POB (NO at 506), then the trace data, which represents all data writes to the local memory, is sent to the POB at 508.

If the single observation unit is a bus observation unit BOB (YES at 506), then the trace multiplexer 412 first routes the local memory data trace through the BOB adaptation layer 414 at 510 to convert the CPU trace output data to data which is understood by the BOB. The trace data, representing all data writes to the local memory, is then sent to the BOB at 512.

Thus, the present invention advantageously enables observation of a plurality of CPUs in parallel for data write traces without increasing the number of observation units in a given computer processing system or increasing the bandwidth requirement to the trace memory. Although the present description differentiates between the typical trace mode which routes CPU trace data only to POBs, and a second trace mode for a CPU parallel trace mode for tracing a plurality of CPUs in parallel by routing trace data to POBs or BOBs, one skilled in the art will realize that the selection of trace data from the local memory and the routing of such trace data to a particular observation unit may be based upon other factors.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for tracing data write signals from a plurality of CPUs with local memories in parallel in a computer processing system, the method comprising:
   in a first trace mode:
      outputting first trace data to a first observation unit, the first trace data only representing data writes of a first CPU to a first local memory of the first CPU, and not representing SRI slave data writes of a second CPU to the first local memory of the first CPU;
   receiving a signal to switch from the first to a second CPU parallel trace mode; and
   in the second, CPU parallel trace mode:
      signaling a parallel trace mode multiplexer to activate the parallel trace mode multiplexer to output second trace data to the first observation unit, the second trace data representing both data writes of the first CPU and SRI slave data writes of the second CPU to the first local memory of the first CPU.

2. The method of claim 1, wherein the first observation unit comprises a processor observation unit.

3. The method of claim 1, wherein the first observation unit comprises a bus observation unit.

4. The method of claim 3, further comprising converting the CPU trace output data to data which is understood by the bus observation unit before outputting the data to the bus observation unit.

5. A system for tracing data write signals from a plurality of CPUs in parallel comprising:
   the plurality of CPUs configured to output CPU write back trace data and to receive SRI slave trace data,
   a plurality of local memories, each of the plurality of local memories coupled to a respective one of the plurality of CPUs, and each configured to receive the CPU write back trace data and the SRI slave trace data from a respective CPU; and
   a plurality of parallel trace multiplexers each coupled to a respective one of the plurality of local memories and configured to select either a first trace mode or a second trace mode for routing the local memory data trace.

6. The system of claim 5, wherein the second trace mode traces data write signals from the plurality of CPUs in parallel.

7. The system of claim 5, further comprising a plurality of single observation units, each of the plurality of single observation units coupled to a respective one of the plurality of local memories, and configured to receive the local memory data trace from the respective local memories.

8. The system of claim 7, wherein at least one of the plurality of the single observation units comprises a bus observation unit.

9. The system of claim 8, further comprising at least one bus observation block adaption layer coupled to at least one of the parallel trace multiplexer for converting the CPU trace output data to data which is understood by the bus observation unit.

* * * * *